United States Patent [19]
Bolden et al.

[11] 3,827,671

[45] Aug. 6, 1974

[54] LOW PRESSURE BALL VALVE WITH ANNULAR SEAL

[75] Inventors: James D. Bolden; Floyd G. Koller, both of Dayton, Ohio

[73] Assignee: Auto-Valve, Inc., Dayton, Ohio

[22] Filed: June 11, 1973

[21] Appl. No.: 368,690

[52] U.S. Cl. ............ 251/84, 251/172, 251/288, 251/297, 251/315, 251/317
[51] Int. Cl. ............................................. F16k 5/14
[58] Field of Search ............ 251/84, 172, 175, 288, 251/297, 315, 317

[56] References Cited
UNITED STATES PATENTS

| | | | |
|---|---|---|---|
| 2,768,806 | 10/1956 | Koehler | 251/297 X |
| 3,030,068 | 4/1962 | Priese | 251/317 X |
| 3,160,387 | 12/1964 | Windsor | 251/317 X |
| 3,386,699 | 6/1968 | Petter | 251/315 |
| 3,767,162 | 10/1973 | Olsson | 251/84 |

*Primary Examiner*—Harold W. Weakley
*Attorney, Agent, or Firm*—Dybvig & Dybvig

[57] ABSTRACT

A valve comprising a valve body in which a ball valve is centered between two annular seals. The seals are made from an elastic material like rubber and have a thin layer of Teflon on the sides facing the ball valve. The seals are specially shaped to provide for a low seal-loading pressure and to seal at the upstream side of the valve. A spring loaded handle is biased to urge the valve to a closed position.

11 Claims, 4 Drawing Figures

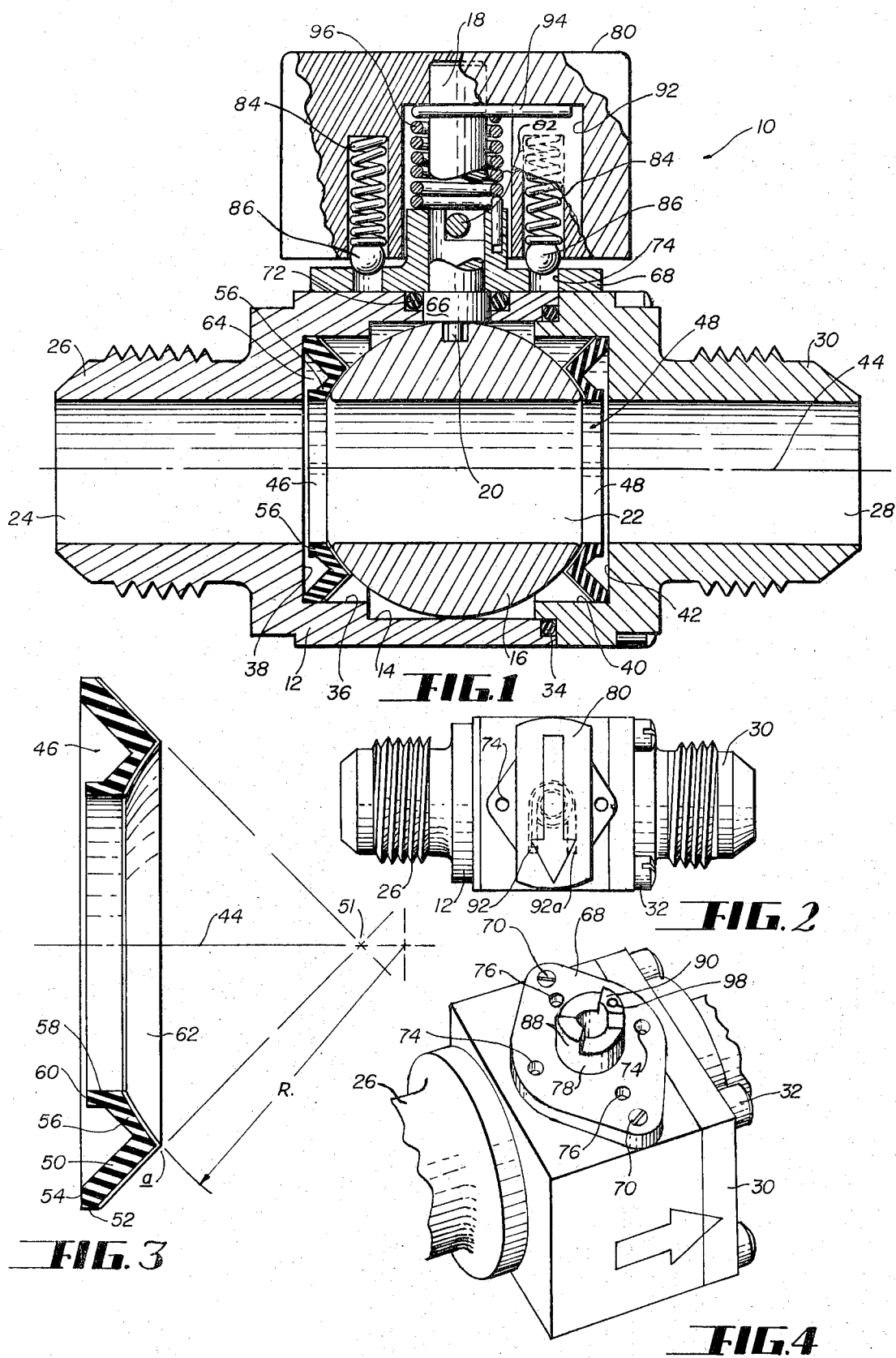

LOW PRESSURE BALL VALVE WITH ANNULAR SEAL

BACKGROUND OF THE INVENTION

This invention relates to a ball-type valve fitted with annular seal members and is more specifically directed to the structure of the seal members and a means for biasing the operating handle of the valve to a closed position.

The present invention is useful in applications which require the use of a low-pressure, floating-ball-type valve which has very little seal-loading pressure, and in applications which require the valve to seal on the upstream side of the valve.

One of the problems of the prior art valves of the type described above is that when the seals are made of rubber alone, the seals tend to expand in the presence of some liquids, like aromatics in gasoline, and thereby increase the seal-loading pressure making it difficult to operate the valve. When the seals are made of a synthetic material like Teflon, the seals are too rigid to effectively seal in low pressure applications. The rigid material also tends to score the ball valve especially when foreign material like dirt lodges between the seal and the ball valve itself, thereby impairing the sealing quality of the seals.

The present invention obviates the problems enumerated above by the low cost construction to be described hereinafter.

The present invention is useful as a valve in fuel draining operations and is especially valuable where contamination is a problem. It can be manufactured to meet the current military test specification MIL-V-25023 for valves of this type.

Some representative prior art ball valve constructions are shown in the following United States Patents:

| | | |
|---|---|---|
| 2,698,731 | Koehler et al. | Jan. 4, 1955 |
| 3,056,577 | Kulisek | Oct. 2, 1962 |
| 3,096,786 | Rost | July 9, 1963 |
| 3,347,517 | Scaramucci | Oct. 17, 1967 |
| 3,356,333 | Scaramucci | Dec. 5, 1967 |
| 3,394,915 | Gachot | July 30, 1968 |
| 3,445,087 | Priese et al. | May 20, 1969 |
| 3,448,033 | Priese et al. | Jan. 6, 1970 |
| 3,497,176 | Priese et al. | Feb. 24, 1970 |

SUMMARY OF THE INVENTION

This invention relates to a ball-type valve fitted with annular seal members and a means for biasing the valve to either a closed or an open position.

The seal members are made of an elastic material like rubber and have a thin layer of synthetic material like Teflon on the sides of the seal members which face the floating ball valve in the valve. The seal members have a self-supporting shape specially designed to provide a relatively thick section which supports a thinner concave section that seals against the periphery of the ball valve. When the ball valve is rotated to open and close the valve, the seal members wipe away contaminants which may accumulate on the ball valve surface. The concave section has a radius of curvature slightly greater than the radius of the ball valve to promote a better wiping or sealing action. The ball valve is supported between the seal members which are located on opposed sides of the ball valve, and fluid on the upstream side enters behind the seal member on the upstream side of the valve to more tightly wedge the associated concave section against the periphery of the ball valve. The unique construction of the seal members also establishes a seal on the downstream side which is enhanced by the upstream pressure should the upstream seal fail for any reason.

BRIEF DESCRIPTION OF THE DRAWINGS

FIG. 1 is a cross sectional view, in elevation, of a ball-type valve showing the seal members of this invention and means for returning the operating handle to a closed position. The handle portion of the valve is shown in side elevation with parts broken away and in cross section.

FIG. 2 is a plan view, in elevation and on a reduced scale, showing the operating handle in the closed position.

FIG. 3 is an enlarged cross sectional view of the sealing member of this invention.

FIG. 4 is a view in perspective showing a portion of the valve body and a detent plate used with the means for returning the operating handle to a closed position.

DETAILED DESCRIPTION OF THE INVENTION

FIG. 1 is a cross sectional view of a valve designated generally as 10 in which this invention is incorporated. The valve 10 is of the self-centering ball type and includes a valve body 12 having a cylindrical bore 14 therein to form a chamber in which a ball valve 16 is rotatably mounted. The ball valve 16 is rotated between closed and open positions by a stem 18 having a Woodruff type key 20 on one end thereof, which key loosely fits into a matching arcuately shaped slot on the ball valve 16.

When the ball valve 16 is in the open position shown in FIG. 1, a fluid passage 22, passing therethrough, is axially aligned with a passage 24 in an end connector 26, and is also axially aligned with a passage 28 in an end connector 30. It will become apparent that the valve 10 is bi-directional. For convenience of description, the valve is marked with an arrow in FIG. 4 indicating that the passage 24 is an inlet passage and, therefore, the end connector 26 is described as an inlet connector. Similarly the passage 28 is referred to as an outlet passage and the end connector 30 as an outlet connector. In the embodiment shown, the connector 30 is connected to the valve body 12 by fasteners 32 (FIG. 2) and a suitable O-ring 34 is used to seal the two members together in fluid tight engagement.

The valve body 12 (FIG. 1) has a second cylindrical bore therein to produce a peripheral wall at 36 terminating at an annular end wall 38 surrounding the inlet passage 24. The outlet connector 30 also has a cylindrical bore therein to produce a peripheral wall at 40 which terminates at an annular end wall 42 which surrounds the outlet passage 28. The longitudinal axes of the bore 14, peripheral wall 36, peripheral wall 40, inlet passage 24, and outlet passage 28 are all coincident and form the central axis at 44 of the valve 10. The diameter of the peripheral walls 36 and 40 are equal to each other and slightly smaller than the cylindrical bore 14. The diameter of the ball valve 16 is slightly smaller than the diameter of bore 14, and the ball valve is supported on opposed sides thereof of a pair of annular seal members designated generally as 46 and 48. Again for convenience the seal member 46 is termed an inlet seal and the seal member 48 an outlet seal.

The inlet seal member 46 is shown in an enlarged view in FIG. 3, and, because the outlet seal member 48 is identical thereto, only member 46 will be described in detail. The seal member 46 has a first annular section 50 formed as a cone of revolution about its center axis which, when it is assembled in the valve 10, is coincident with the central axis 44, whose sides converge towards the ball valve 16 at an angle $a$ of about 45°. The section 50 has a first end with mutually perpendicular peripheral faces 52 and 54. End face 52 abuts against the peripheral wall 36 and end face 54 abuts against the annular end wall 38 when the member 46 is positioned in the valve 10 as shown in FIG. 1.

The seal member 46 also has a second annular section 56 formed as a concave spherical section and integrally joined to a second end of the first section 50 to form a cantilever-type section which wipes against the periphery of the ball valve 16. The second section 56 has a radius of curvature R from a point located on the central axis 44. When the seal member 46 is in the unstressed condition shown in FIG. 3, the radius R is about 1.2 times larger than the radius of the ball valve 16. The apex of the cone of revolution of the first section 50 would lie on the central axis 44 at 51 near the point of origin of radius R.

The seal member 46 also has a third annular section 58 formed as a cylindrical section terminating in an annular face 60. The face 60 is axially displaced from the plane including the end face 54 a slight distance towards the second section 56 as shown. It should be noted that the thickness of the first section 50 is greater than the thickness of the second section 56, as the first section 50 supports the second section 56 in wiping, sealing engagement with the ball valve 16. The second section 56 is thicker in cross section near the third section 58 than it is at the junction with the first section 50.

The body of seal member 46 is made from suitable rubber compounds. In accordance with this invention, it also has a thin layer 62 of tetrafluoroethylene material like Teflon on the sides of the first section 50 and second section 56 which face the ball valve 16. The Teflon layer 62 provides good bearing qualities to keep the seal-loading pressure to a minimum. It must be quite thin so that it is sufficiently flexible to conform to the surface of the ball 16. A seal member 46 having a body of Buna N rubber compound with a Durometer of 60, with a 0.010 inch thick Teflon layer 62 is satisfactory for purposes of this invention.

In making the seal members 46 and 48, Teflon sheeting (of the desired thickness) having one surface thereof etched is utilized. An epoxy adhesive is spread over the etched surface of the sheeting, and the sheeting is conventionally bonded to a layer of uncured rubber forming a lamination which is then conventionally molded and cured to the shape shown in FIG. 3.

When the seals 46 and 48 are assembled on opposed sides of the ball valve 16, they assist in supporting the ball valve in a self-centering position as shown in FIG. 1. During assembly, the ball engaging surface of the cantilevered second section 56 of each seal is forced into conformity with the ball because, as noted above, its radius of curvature is slightly larger than the radius of the ball. The resultant deformation of the rubber forming the seals 46 and 48 is the primary source of the seal-loading pressure exerted by the seals 46 and 48 against the ball valve 16. As apparent, the seal-loading pressure is quite low. Nevertheless, the cantilevered second section 56 snugly engages the ball valve 16. When the ball valve 16 is rotated as described below to open and close the valve, the second section 56 wipes across the surface of the ball valve 16 in a manner similar to the manner in which a windshield wiper wipes across a windshield. The wiping action of the seal members serves to keep the surface of the ball valve 16 free from contaminants because it is wiped clean each time the valve is opened or closed. The problems associated with some seals wherein contaminants tend to lodge in the seal member is thus materially reduced and may even be eliminated.

When the ball valve 16 is rotated to the closed position, the fluid under pressure from the inlet passage 24 fills the cavity designated 64 bounded by the seal member 46 and the confronting wall 38. The fluid filling the cavity 64 provide an additional pressure urging the second section 56 into intimate engagement with the ball valve 16. Accordingly, there is a positive seal provided at the upstream side of the valve. It will also be noted that the seal member 46 and 48 are so constructed that the downstream seal member, i.e., seal member 48 in the case illustrated herein, provides a seal even if the sealing at the upstream end should fail when the valve is closed. Thus, with reference to FIG. 1, the surfaces of the outlet seal member 48 engaging the adjacent walls 40,42 and the concave surface engaging the ball valve 16 provide a seal should fluid escape around the upstream or inlet seal member 46 into the cavity surrounding the ball valve 16. The seals provided by these surfaces of the seal member 48 would be enhanced by the fluid which would be under upstream pressure because, again, the sealing surfaces would be more tightly wedged into engagement with the surfaces 40,42 and the ball valve 16 by the fluid pressure.

In normal operation the end faces 60 (FIG. 3) of the seal members 46 and 48 are spaced from their adjacent end walls 38 and 42. Consequently the ball valve 16 remains self-centered and the seal-loading pressure remains at a low level. It may be noted, however, that the end face 60 of the downstream seal member 48 could act as a safety stop and bear against the end wall 42 should the pressure in the valve exceed design limits.

Low pressure ball valves of the type described herein are often used with fuels or other liquids having chemicals such as aromatics which cause the rubber from which seals 46 and 48 are produced to swell. Because the seals 46 and 48 are designed with a substantial open area between the rear faces of the seals and the adjacent end walls 38 and 42, such as represented by the cavity 64 in FIG. 1, the rubber component of the seals 46 and 48 can swell to a substantial degree without effecting either the self-centering action of the seals or creating a material increase in the seal-loading pressure.

The means for rotating the ball valve 16 between the open and closed positions, which was alluded to earlier, is shown in FIGS. 1 and 4 and includes the stem 18 previously mentioned. The stem 18 has a cylindrical shoulder 66 rotatably mounted in an aperture in the valve body 12. A detent plate 68 fastened to the body 12 by screws 70 (FIG. 4) abuts against the shoulder 66 to retain the stem 18 in the body 12 and to align the stem 18 with its longitudinal axis perpendicular to the central axis 44. A suitable O-ring 72 placed in a recess surrounding the shoulder 66 provides a fluid seal between the stem 18 and the valve body 12.

As best shown in FIG. 4, the detent plate 68 has two pairs of diametrically opposed and substantially equally spaced detent holes 74 and 76 located on a common circle whose center lies on the longitudinal axis of the stem 18. The plate 68 also has a collar 78 surrounding the stem 18 whose upper end is mounted in a central bore in a handle 80. The stem 18 is fixed to the handle 80 by a pin 82 passing through holes in both the stem and the handle. The handle 80 also has two diametrically opposed holes drilled therein to each receive a detent spring 84 and a detent ball 86 shown in FIG. 1. The springs 84 and balls 86 cooperate with the pairs of holes 74 and 76 to hold the handle 80 in two detented positions which are substantially 90° apart. Upstanding lugs 88 and 90 on the collar 78 cooperate with the pin 82 to limit movement of the handle 80. By this means the rotary motion of the handle 80 is restricted to slightly more than 90°. Accordingly, the handle 80 can be moved between its detented positions but substantial further movement is prevented. Movement slightly in excess of 90° is provided primarily for convenience in manufacture to assure that the handle 80 can be moved fully between its detented positions. As apparent from inspection of the drawing, the detent balls 86 are seated in the holes 74 of the detent plate 68 when the valve is open and in the holes 76 when the valve is closed.

In the embodiment illustrated the handle 80 is biased to close the valve. For this purpose the handle 80 is recessed to provide an elongated slot 92 which receives one end 94 of a torsion spring 96 surrounding the portion of the stem 18 inside the handle 80. The other end of the spring 96 fits into a vertically extending hole 98 in the lug 90. When the handle 80 is in the closed position, the spring 96 is under low tension. Movement of the handle 80 into the open position more tightly coils the spring 96 in order to produce the aforementioned bias. The torsion spring 96 is not sufficiently strong to overcome the grip of the spring biased detent balls 86. Accordingly, when the valve is in the full open position with the detent balls 86 lodged within the detent holes 74, the valve will remain open. However, when the handle 80 is manually moved out of its detented open position, the spring 96 will drive the ball valve 16 to the closed position.

With reference to FIG. 2, the handle 80 is shown to have another recess, designated 92a, which is parallel to the recess 92 but on the opposite side of the centerline of the handle 80. The recess 92a is provided to receive the end (not shown) of a spring (not shown) identical to the spring 96 but wound in the opposite direction to the spring 96, thereby to produce a valve which is biased to the opened rather than the closed position. Thus by virtue of the handle design, valves in accordance with this invention may optionally be biased to either the opened or the closed position simply by selection of the appropriate spring.

Because of the minimal seal-loading pressure upon the ball valve 16 and because the biasing spring 96 is relatively weak, valves constructed in accordance with this invention can be produced which require no more than 10 inch pounds torque to rotate the handle 80 from a spring biased and detented closed position to its detented open position. Of course, closure of the illustrated valve requires less torque since only the detent springs 84 need be overcome, the valve then being closed by the torsion spring 96.

Although the presently preferred embodiment of this invention has been described, it will be understood that within the purview of this invention various changes may be made within the scope of the appended claims.

Having thus described our invention, we claim:

1. A low pressure valve comprising:
   a valve body having an inlet and an outlet and a valve chamber communicating with the inlet and the outlet to form a passageway about a central axis through the body, said valve member having a generally cylindrical peripheral wall meeting a first annular end wall around the inlet and meeting a second annular end wall around the outlet;
   a ball valve disposed in the chamber and having a fluid passage therethrough;
   means for rotating said ball valve from a position opening said passageway to a position closing said passageway;
   a pair of annular seal members disposed in said chamber, one of said seal members encircling said inlet and the other seal member encircling said outlet, each of said seal members engaging said ball valve on opposed sides thereof to provide a self-centering ball valve;
   each said seal member having a first annular section formed as a cone of revolution about said central axis of the valve body and having sides converging towards said ball valve; said first section having first and second ends with said first end engaging said cylindrical peripheral wall and the associated annular wall in sealing engagement therewith;
   a second annular section formed as a concave spherical section and being integrally joined to said first section at said second end to form a cantilever-type sealing surface; said second section when in the unstressed condition having a radius of curvature which is slightly greater than the radius of the associated ball valve; and
   a third annular section formed as a cylinder having a longitudinal axis which is coincident with said central axis and being integrally joined to said second section at an inner end thereof;
   said first, second, and third sections being formed of a yieldable material like rubber, and said first and second sections having a thin layer of polymeric material secured thereto on the sides facing said ball valve; and
   said second sections with the layer of polymeric material thereon being in sealing engagement with the periphery of said ball valve on the opposed sides thereof.

2. The valve as claimed in claim 1 in which said ball valve has a radius equal to R and in which said radius of curvature of said second section of each said seal member is equal to 1.2 R when the second section is in said unstressed condition.

3. The valve as claimed in claim 1 in which said layer of polymeric material is Teflon having a thickness of approximately 0.010 inch.

4. The valve as claimed in claim 1 in which said first annular sections of said seal members converge towards said ball valve at an angle of approximately 45° relative to said central axis, and in which said third annular section of each said seal member has an annular face which is axially displaced from its associated annular end wall in the valve body, said first, second, and third sections of each said seal member forming an annular recess on the side of the seal away from the ball valve, said second annular section of the seal member encircling said inlet being forced into sealing engagement with the periphery of said ball valve by fluid under pressure from said inlet to provide an upstream seal in said valve.

5. The valve as claimed in claim 4 in which said ball valve has a radius equal to R and in which said radius of curvature of said second section of each said seal member is equal to 1.2 R when the second section is in said unstressed condition; and in which said layer of polymeric material is Teflon having a thickness of 0.010 inch; said first section of each said seal member having a thickness in cross section which is thicker than the cross sectional thickness of said second and third sections.

6. The valve as claimed in claim 1 in which said ball valve has a driving slot in the periphery thereof and in which said means for rotating said ball valve comprises:

a stem member rotatably mounted in an aperture in said valve body in fluid sealing engagement therewith to engage said driving slot and to rotate said ball valve between said positions opening and closing said passageway;

a detent plate secured to said valve body and having two pairs of diametrically opposed detent holes therein, with said holes lying on a circle which is concentric with the aperture in said valve body;

an operating handle fixed to said stem member to rotate it;

spring loaded ball means located in said handle to cooperate with the pairs of detent holes to resiliently and selectively hold said ball valve in said positions opening and closing said passageway; and spring means connected between said handle and said detent plate to resiliently bias said ball valve to one of said positions when the handle is manually moved to dislodge the ball means from a pair of said detent holes.

7. The valve as claimed in claim 6 in which said spring means is located in a recess in said handle to hide it from view, and in which said spring means biases said ball valve to a position closing said passageway, and in which said detent plate has angularly spaced lugs thereon to limit the rotational movement of said handle.

8. An annular seal member for use with a low pressure valve of the free floating ball variety in which the sealing members encircle the inlet and outlet of the valve and are also disposed in the chamber of the valve on opposed sides of the associated ball valve, comprising:

a first annular section formed as a cone of revolution about a longitudinal axis which coincides with a central axis of the chamber of the valve in which the seal member is to be used, said first section having a first end to engage a cylindrical peripheral wall in said chamber and an annular wall surrounding either the inlet or outlet, and also having a second end;

a second annular section formed as a concave spherical section which extends towards said longitudinal axis and being integrally joined to said first section at said second end to form a cantilever-type sealing surface; said second section when in the unstressed condition having a radius of curvature which is slightly greater than the radius of the ball valve with which the seal member is to be used; and a third annular section formed as a cylinder having a longitudinal axis which is coincident with the said axis of said first annular section and being integrally joined to said second section at an inner end thereof;

said first, second, and third sections being formed of a yieldable material like rubber, and said first and second sections having a thin layer of polymeric material secured thereto on the sides which are to face said ball valve.

9. The seal member as claimed in claim 8 in which the radius of curvature of the second section is equal to 1.2 R where R is equal to the radius of the ball valve with which the seal member is to be used.

10. The seal member as claimed in claim 9 in which said layer of polymeric material is Teflon having a thickness of 0.010 inch, and in which said first section has a thickness in cross section which is thicker than the cross sectional thickness of said second section.

11. The seal member as claimed in claim 8 in which said first section converges towards its longitudinal axis at an angle of 45° and the point of the radius used in forming said second section also lies on said longitudinal axis near the apex of the cone of revolution of said first section, said third section terminating in an annular face which is axially displaced closer to said apex than is the first end of said first section, and in which said second section has a cross section which is thicker near said inner end thereof than it is near the second end of said first section.

* * * * *